(12) United States Patent
Kopp et al.

(10) Patent No.: US 8,086,951 B2
(45) Date of Patent: Dec. 27, 2011

(54) REMOTE WEB-BASED DOCUMENT CREATION SYSTEM AND METHOD

(75) Inventors: Kevin Kopp, Minneapolis, MN (US); Parameswaran Ramakrishnan, Baton Rouge, LA (US); Chris Bordeman, Baton Rouge, LA (US)

(73) Assignee: Appone Services, Inc., Baton Rouge, LA (US)

( * ) Notice: Subject to any disclaimer, the term of this patent is extended or adjusted under 35 U.S.C. 154(b) by 496 days.

(21) Appl. No.: 12/256,178

(22) Filed: Oct. 22, 2008

(65) Prior Publication Data

US 2010/0114995 A1  May 6, 2010

(51) Int. Cl.
*G06F 7/06* (2006.01)
*G06F 7/22* (2006.01)

(52) U.S. Cl. ........ 715/224; 715/221; 715/226; 715/234; 705/342

(58) Field of Classification Search ............... 707/811; 715/277
See application file for complete search history.

(56) References Cited

U.S. PATENT DOCUMENTS

| | | | | |
|---|---|---|---|---|
| 6,006,242 | A * | 12/1999 | Poole et al. | 715/209 |
| 6,873,992 | B1 * | 3/2005 | Thomas | 1/1 |
| 7,260,584 | B2 | 8/2007 | Hailey et al. | |
| 7,444,302 | B2 * | 10/2008 | Hu et al. | 705/38 |
| 7,496,840 | B2 | 2/2009 | Hailey et al. | |
| 2002/0046235 | A1 | 4/2002 | Foy et al. | |
| 2002/0052896 | A1 * | 5/2002 | Streit et al. | 707/517 |
| 2003/0172343 | A1 | 9/2003 | Leymaster et al. | |
| 2004/0044949 | A1 * | 3/2004 | Rowe | 715/500 |
| 2004/0049445 | A1 * | 3/2004 | Kishore | 705/37 |
| 2004/0093378 | A1 * | 5/2004 | Warnock | 709/203 |
| 2004/0122831 | A1 * | 6/2004 | Ha et al. | 707/100 |
| 2005/0081144 | A1 | 4/2005 | Hailey et al. | |
| 2005/0154983 | A1 * | 7/2005 | Hailey et al. | 715/530 |
| 2006/0036612 | A1 * | 2/2006 | Harrop et al. | 707/100 |
| 2006/0294002 | A1 * | 12/2006 | Brett | 705/38 |
| 2007/0192679 | A1 | 8/2007 | Foushee, Jr. et al. | |
| 2008/0022107 | A1 * | 1/2008 | Pickles et al. | 713/176 |

* cited by examiner

*Primary Examiner* — Stephen Hong
*Assistant Examiner* — Keith Bloomquist
(74) *Attorney, Agent, or Firm* — Foley & Lardner LLP

(57) ABSTRACT

A system that may be used to generate documents, where the system is accessible from and integratable with remote systems is provided. A document generation system that may be provided as a service, in the sense that the system may be accessed via, e.g., the Internet, from remote systems such as credit aggregators. The system takes in information regarding the requirements (e.g., type of transaction, number of parties, amount of loan, price, governing law, etc.) of the document needed (e.g., a loan application, construction contract, etc.) and produces an appropriate form based on the input information. It should be noted that access to the document generation system is effectuated by an Internet/network connection via, e.g., a partner provider system such as a DMS, a traditional credit aggregator, a credit aggregator portal, etc. Electronic signature and secure archiving may be provided for generated documents.

26 Claims, 3 Drawing Sheets

REMOTE WEB-BASED DOCUMENT CREATION SYSTEM AND METHOD

FIELD OF THE INVENTION

Embodiments of the invention relate generally to the creation of documents (such as contracts, forms, user manuals, instructional texts, and others). More particularly, embodiments of the invention allow for the creation and printing of documents by assembling document components and applying precedence and rules at a document generation system in response to data received from a remote system.

BACKGROUND OF THE INVENTION

Document production systems that insert customer-specific content into a pre-fabricated document are known. For example, in some known systems a boilerplate document is produced using word processing software. The boilerplate document is then reviewed and revised by a document developer, and stored in a storage device, such as a disk drive of a computer. The boilerplate document is then made available for use to an end-user, such as a bank or loan officer. The end-user retrieves the boilerplate document from the storage device and enters specific content into the document, such as names, addresses, prices, etc. Once the desired content is inserted into specified locations on the document, the completed form is printed.

Other document systems use a conventional relational database scheme to test specific input information against a table of rule sets which, in turn, are directly linked to various boilerplate clauses. For example, when working with insurance forms, a rule set is assigned to each insurance policy clause and each endorsement clause. The insurance and endorsement clauses and rule sets are stored in a memory coupled to the main processor. Each rule set includes at least one rule that must be satisfied in order to include the associated clause in the document. After entering customer-specific parameters into the computer, such as desired insurance coverages and the policy holder's state of residence, each and every rule in each and every rule set is evaluated to determine whether a particular clause is to be included in the document. In order to print a document, a printer database containing a redundant copy of each insurance and endorsement policy clause is utilized to supply the appropriate clauses.

Additionally, known document production systems are "captive" to a local/host system. That is, the documents described above are generally stored on a local storage device of a computer local to the end-user, and the printing of a document is performed on a localized printer. To implement such known document production systems, the end-user installs and/or configures, e.g., the documents, at a local computer, where boilerplate document updates and changes to rule sets for example, are also locally implemented.

Although prior systems are functional, there remains a need for a document generation system that, among other things, can be integrated with existing front-end systems (such as loan origination systems) and existing back-end systems (such as existing printer servers and networks). Moreover, because prior art systems are unable to provide "software as a service," a need exists for integrating remote systems with a document generation system without requiring constant maintenance, and by simply building a web interface to the document generation system. Furthermore, there remains a need for a document generation system that can be integrated with remote front-end systems such as, e.g., remote dealer management systems (DMSS) and remote credit aggregator partners/portals for access via networks such as the Internet using a real-time connection(s).

SUMMARY OF THE INVENTION

Various embodiments of the present invention provide a document generation system that may be provided as a service, in the sense that the system may be accessed via, e.g., the Internet, from remote systems such as credit aggregators. The system takes in information regarding the requirements (e.g., type of transaction, number of parties, type of collateral, amount of loan, price, governing law, etc.) of the document needed (e.g., a loan application, construction contract, etc.) and produces an appropriate form based on the input information. It should be noted that access to the document generation system is effectuated by an Internet/network connection via, e.g., a partner provider system such as a DMS, a credit aggregator portal, etc. Alternatively, the document generation system may be installed, e.g., at a client's location and invoked as a local service running on a client local area network (LAN) inside the client LAN firewall.

In accordance with one embodiment, a method is provided comprising receiving required data at a remote system and generating extensible markup language (XML)/XML-based data representative of the required data. The method further comprises transmitting the XML data to the document generation system via a data network and validating the required data. At least one document to be populated with the required data is selected and/or assembled and the required data is merged therewith in one of an automatic, manual, or hybrid manner. Additionally, the at least one document is streamed in a presentation format to the remote system for presentation and/or printing.

Moreover, a Web-based test application can be provided with the document generation system. The Web-based test application can maintain a repository of user data objects, validated results, etc., where the user data objects can be passed to the document generation system. The end-user is then presented with, e.g., the documents and/or field values that have changed since a last validated run of the user data object.

As is apparent from the above, it is an advantage of the present invention to provide methods and systems of creating documents. Other features and advantages of the present invention will become apparent by consideration of the detailed description and accompanying drawings.

DETAILED DESCRIPTION OF THE PREFERRED EMBODIMENTS

Figure 1:
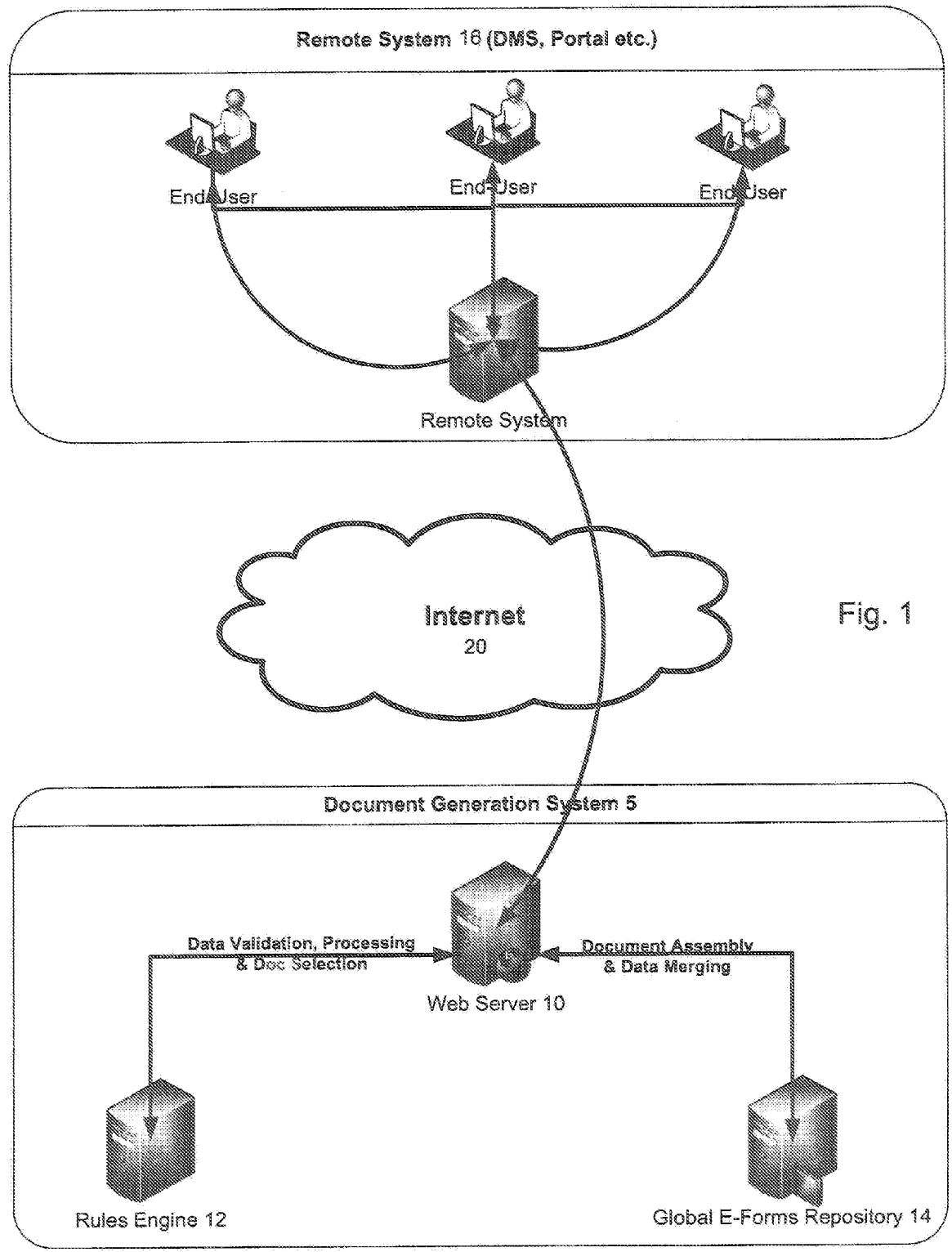
FIG. 1 illustrates an exemplary architecture of a remote access and integration embodiment of the invention.

Before embodiments of the invention are explained in detail, it is to be understood that the invention is not limited in its application to the details of the construction and the arrangements of the components set forth in the following description or illustrated in the drawings. The invention is capable of still other embodiments and of being practiced or being carried out in various ways. Also, it is to be understood that the phraseology and terminology used herein is for the purpose of description and should not be regarded as limiting.

An exemplary system of one embodiment can include, e.g., one or more remotely located systems such as computers/workstations operable by one or more end-users (e.g., auto dealer, auto finance officer, etc.) such as that illustrated in FIG. 1. Additionally, FIG. 1 illustrates that a document generation system 5 can have integrated therein, e.g., an API gateway, a document selection engine, documents, an editing module, and a document generation module, where data validation, processing, and document selection can be performed by and/or between a rules engine/application module 12 and a web server 10. Document assembly and data merging can be performed by and/or between a global e-forms repository 14 and the web server 10, where the global e-forms repository can be, e.g., document libraries offered by financial services provided by one or more financial services providers. Preferably, however, at least a majority of the content contained in the document libraries are offered by a service provider that implements the document generation system 5. Moreover, the remote system 16 can submit data to and receive documents from the document generation system 5 via the Internet 20 or some other communications/data network. It should be noted that more or less processes and/or engines and servers may be integrated into the document generation system 5.

It should be noted that the global e-forms repository 14 can contain standard financial services content and government-generated content. Additionally, custom documents such as those provided by, e.g., lenders and/or dealers can be loaded into the global e-forms repository, as well as any available or to-be-developed e-forms/e-forms modules. For example, a service provider of the document generation system 5 can provide "warrantied" content such as motor vehicle/services/goods modules customized on a per-lender basis, per-jurisdiction basis, etc.

With regard to motor vehicle contracts, content can include retail indirect motor vehicle credit applications used specifically for the retail (indirect) sale or lease of a new/used motor vehicle that is compliant with both Regulation B and the Equal Credit Opportunity Act. Other exemplary content can include, e.g., a federally required odometer statement at the time of transfer or ownership of a vehicle, and motor vehicle retail sales installment contracts used to document the financing of a consumer's purchase of a new/used automobile. For example, various types of precomputed and simple interest documents such as Regulation Z and FED box and insurance disclosures that have consistent and state-specific language for all 51 jurisdictions may be provided.

Alternatively, motor vehicle leases, such as a multistate motor vehicle lease and state-specific leases designed to meet Regulation M requirements can be provided, where the lease can be for close-end lease transactions with monthly payments used for business and/or consumer purposes. Goods and services contracts are also contemplated as being provided in various embodiments, including, e.g., universal credit applications used to obtain typical information needed for underwriting purposes, universal credit applications with an included creditor worksheet, as well as retail sales installment contracts for various types of goods and services along with any requisite disclosures.

Still other additional disclosures and/or ancillary documents may be provided in the global e-forms repository 14 including, for example: credit denial documentation; credit termination notifications; account information sheets for gathering additional information to comply with identification requirements of Section 326 of the USA Patriot Act; agreements to provide insurance; debt cancellation disclosure documentation; privacy disclosures tailored to reflect a particular institutions policies; FTC cosigner notices; a notice of placement of insurance; Uniform Commercial Code (UCC) financing statements; and lender documentation for, e.g., informing cosigners of their responsibilities and possible liabilities. It should be noted that the content described herein is merely exemplary and more or less documentation may be provided in the global e-forms repository 14, as well as documentation in various languages. Hence, users of the document generation system 5 can have access to a variety of pre-loaded content at their disposal.

The remote system 16 can include, e.g., a DMS, a lender, traditional credit aggregators, a credit aggregator portal, etc., that is accessible by an auto dealer, for example. A DMS can refer to a bundled system created for auto dealerships that provide software for auto-related financing, sales, parts, inventory, dealership administration, etc. Traditional credit aggregators can refer to, e.g., third party entities that aggregate application across multiple sources for submission to lenders, while a credit aggregator portal can refer to an access point provided by a credit aggregator entity that brings together, e.g., multiple retailers, service providers, lenders, consumers, etc. in a "metamarket" environment. A metamarket is a set of related activities that accomplish a single consumer goal, e.g., the acquisition of a vehicle, for example. In operation then, the credit aggregator positions itself by establishing connections with lenders, product and service providers and retailers, effectively assembling a set of vehicle acquisition services and products provided by service and product providers. Examples of these include lenders, warranty companies, pre-paid maintenance products, GAP Insurers, manufacturers, and the like. By establishing these connections, the credit aggregator is able to establish links with some or all the above parties resulting in, e.g., increased efficiency, market penetration, exposure to consumers. More or less parties and functionality may be included in a "metamarket" and/or performed/provided by a credit aggregator in accordance with various embodiments of the invention.

An auto dealer end-user may desire to perform various transactions. For example, the auto-dealer may desire to create a retail installment contract that a customer signs for transmittal to a bank in association with indirect lending related to an automobile purchase. In accordance with various embodiments, the auto dealer end-user inputs certain contract data, such as customer information required for the indirect lending related to an automobile purchase, at the remote system 16 which interfaces with the document generation system 5 via the Internet 20. Various checks on the inputted contract data/required data can be made at the remote system 16 and/or the document generation system 5, including for example, state-set-specific thresholds such as late fees, state usury caps, maximum fees, whether or not required data for completing the retail installment contract has been entered, etc. For example, if an auto dealer in Texas attempts to create a contract with a 21% annual percentage rate (APR) and the Texas state limit is an 18% APR, generation of the retail installment contract will be denied or "kicked back." It should be noted that various embodiments can be configured to provide document generation and printing for various industries, applications, etc., such as for human resources purposes.

The document generation system 5 may also be operable in a manual or automatic mode. In the manual mode, the auto dealer may select what particular documents related to the retail installment contract are to be generated and/or printed.

In the automatic mode, the document generation system 5 is left to determine what particular documents are to be generated and/or printed. For example, a state-specific indirect lending deal "jacket" may include at least one or more of the following: the retail installment contract itself; a title and license plate application (MV1); a credit application, an "agreement to provide insurance" (ATPI); a buyer's order; a notice to co-signer; an odometer statement; a reference sheet; other transaction-related documents; and other state-specific documents. When the requisite documents are determined and the required contract data has been collected/entered at the remote system, the document generation system 5 can transmit, e.g., presentation copies/version of the documents, to the remote system for display and/or printing. A presentation format can include, e.g., pdf-formatted documents. Alternatively, the document generation system 5 can merge the above-described documents into a single "merged" pdf document for viewing and/or printing.

Figure 2A:
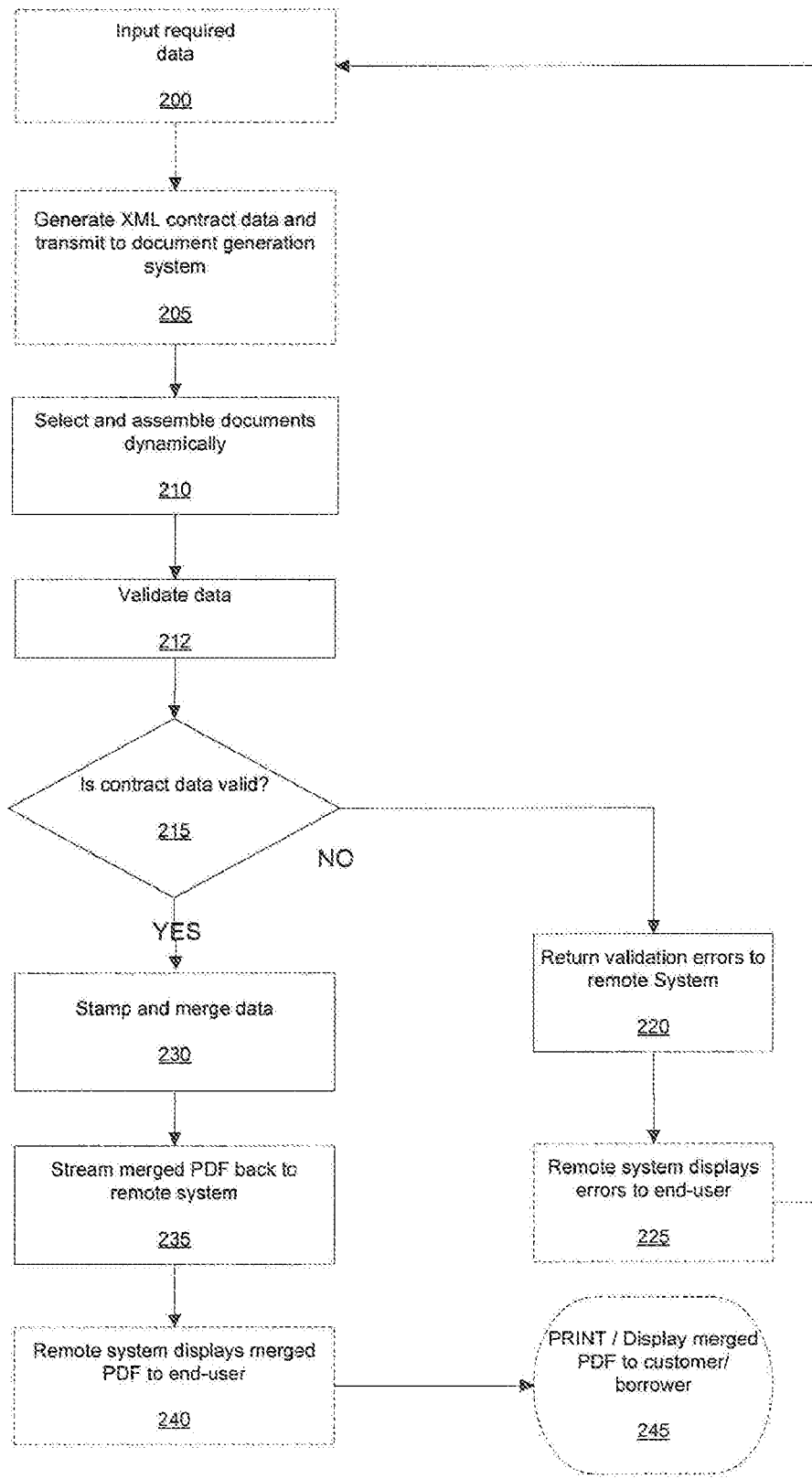
FIG. 2A illustrates an exemplary flowchart of processes performed in accordance with a remote access and integration embodiment of the invention.

FIG. 2A is a flow chart illustrating processes performed in accordance with various embodiments of the invention, where the processes indicated by dashed lines are those that may be performed at the remote system and those indicated with a solid line may be performed at the document generation system. At 200, required data is input by, e.g., an end-user 12, such as an auto dealer. For example, the end-user may log into a remote system provided by a credit aggregator/credit aggregator portal and inputs required data (e.g., contract desking data, credit application data, etc.) It should be noted that although the document generation system will validate submitted data, data validation may be performed on the remote system as well to address the minimum set of required fields for a print transaction to be successful. Moreover, mathematical and financial calculations may be performed on the remote system. At 205, the remote system generates XML contract data from the data input by the end-user 12, which is then submitted to the document generation system via the Internet. It should also be noted that the XML format can either be a generic XML format or a native XML schema or format proprietary to the document generation system. Moreover, mapping and/or translation of contract data can be effectuated using an open standard, such as STAR or MISMO.

At 210, the document generation engine performs document selection if invoked in an automatic mode. If invoked in a manual mode, the remote system specifies which documents are needed in the XML. Once the documents have been selected, the document generation engine validates the contract data at 212 based upon a minimum set of required fields to completely populate the set of documents selected. For example, if the remote system requested a Buyers Order, then the Buyer's home phone number may not be validated as that piece of information is not populated anywhere on the Buyer's Order. Additionally, compliance data pertaining to, for example, state usury maximums, state mandated maximum fees, etc. are validated based upon the document set requested, e.g., a retail installment contract, etc. Additionally, there can also be two types of errors generated during the validation process, e.g., "ERROR" and "WARNING." If the validation finds errors of the WARNING type, the remote system can present these errors to the end-user (e.g., dealer, etc.) and give the end-user an option to "proceed/continue anyways". However, errors of the type ERROR may not be allowed to be overridden or bypassed. That is, if any errors and/or omissions are found during validation at 215, further processing of the contract data is halted and errors/omissions are returned to the remote system at 220, where an end-user is notified of the errors/omissions at 225. The end-user, upon notification of errors and/or omissions may restart the document generation processes again by re-entering required data at 200 or supplement the already-input data at 200.

As noted above, the document generation system may be operated in a manual mode where the end-user/remote system explicitly specifies/selects what documents should be included in the document set. Alternatively, in an automatic mode, the document generation system automatically selects the document set based on the received contract/transaction data. Alternatively still, in a hybrid mode, the document generation system automatically selects a "possible" document set based on the received contract/transaction data. The end-user/remote system may then select one or some subset of the documents from the automatically selected document set. For example, the end-user/remote system may already have certain documents from a previous transaction and is only in need of certain additional documents, but not the entire set of documents automatically selected by the document generation system. If no errors or omissions are found during validation at 210 and/or 215, the document generation system stamps and merges the received contract data into the appropriate places within the one or more documents of the selected (manually or automatically) document set at 230.

At 235, the document generation system streams the merged documents in, e.g., pdf format, back to the remote system. It should be noted that the stream of pdf-formatted documents can be delivered to the remote system in one of two modes. In a merged mode, the document generation system merges all of the documents in the document set into a single pdf-formatted stream. In an individual mode, the document generation system returns multiple pdf-formatted streams to the remote system, i.e., a single stream for each pdf-formatted document of the document set. It should be further noted that other formats in addition to the pdf format may be used to merge and/or stream the documents. At 240, the remote system may display the document(s) of the document set to the end-user 12 and at 245, the end-user 12 of the remote/partner system may print/request printing of the document(s) at an end-user location which may or may not be co-located at the remote/partner system.

Figure 2B:
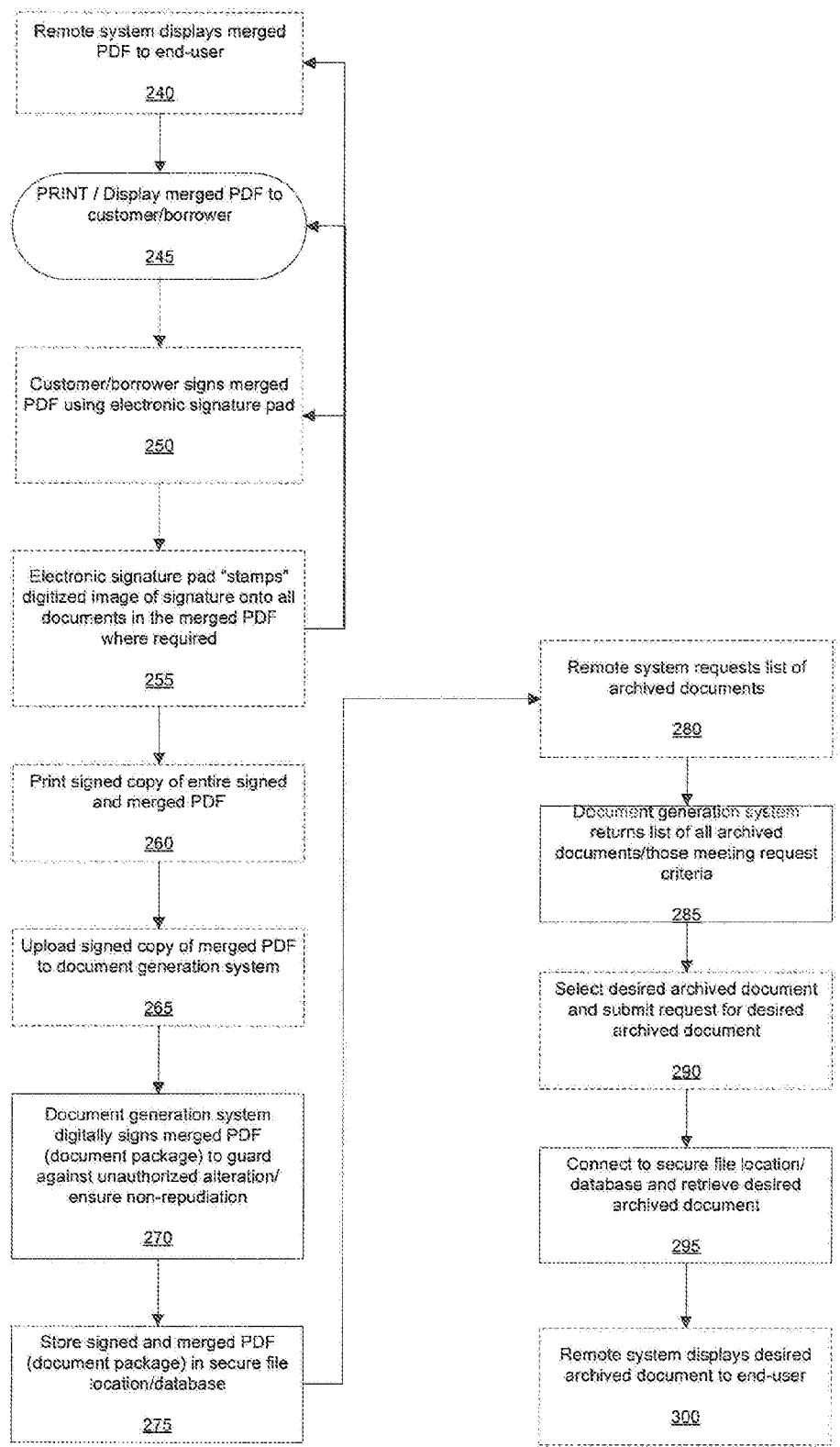
FIG. 2B illustrates an exemplary flowchart of processes performed in accordance with an e-signature function of the invention.

In accordance with another aspect of various embodiments, "e-signature" functionality may be implemented in conjunction with the document generation system described herein. Referring to FIG. 2B, once the remote system displays the document(s) of the document set to the end-user 12 in, e.g., a merged pdf, at 240, the document(s) may be printed and/or displayed to the customer/borrower at 245. The end-user 12 may review the document(s) with the customer/borrower, explain the contents of the document(s), as well as provide any and all federal and/or state-mandated disclosures. At 250, the customer/borrower may then sign the document(s) electronically using, e.g., an electronic signature pad/apparatus, or other similar mechanism. In the event that, e.g., an end-user, such as a dealer, is required to sign one or more documents, the end-user may also electronically sign the one or more documents. At 255, the electronic signature pad stamps a digitized image of the signatures of all required/involved parties, e.g., consumer's/borrower's, dealer, etc onto any and/or all sections of the document(s) where a signature is needed. The above processes are repeated for each consumer/borrower/responsible party associated with a transaction.

At 260 and via the remote system, the dealer may then print a signed copy of the entire document package, which may then be given to the consumer(s) as copies for their records. The remote system then uploads the signed document package to the document generation system/document generation web service securely via, e.g., a standard SOAP web service, at 265. Additional meta-data is provided along with the signed document package that can be used to "index" the package. The document generation web service digitally signs the document package in a manner so that it cannot be altered or changed at 270. Moreover, the document generation web service digitally signs the document package for non-repudiation purposes, i.e., it can be legally proved that the signed document package is the original copy signed by the all requisite parties including but not limited to, e.g., the customer/borrower, dealer, etc. Thereafter, the document generation web service stores the signed document package in a secure location, such as a secure database or other secure file repository/location at 275.

When the end-user 12 (e.g., dealer) wishes to access archived documents/document sets, the remote system submits a request for the document generation system to return a list of available archived documents at 280. Alternatively, a variety of search criteria can be specified as well so that only those archived documents matching the criteria will be returned as a subset of documents, e.g., for a specific end-user, a specific customer/borrower, a specific date of execution, etc. At 285, a list of all/subset of all archived documents is returned to the end-user 12 and the end-user 12 can select a specific document package(s) to view. At 290 and once the end-user 12 selects a specific archived document package to view, the remote system submits a request to the document generation web service to retrieve the document(s) for the selected archived document package. At 295, the document generation web service connects to the secure file location/database where the digitally signed and archived document(s) resides and returns it to the remote system. At 300, the remote system displays the requested package to the end-user 12.

Processes that may be implemented in accordance with various embodiments are described in greater detail in a use-case scenario context. It should be noted that use-case scenarios described herein are not limiting, and are meant to be exemplary. In accordance with a first use-case scenario, a dealer logs into a remote system and submits a credit application containing, e.g., borrower information, collateral information, etc. It should be noted that the credit application itself may be printed via the document generation system for the borrower to, e.g., sign. The credit application is reviewed and approved by one or more lenders on the remote system platform. Thereafter, the dealer reviews lender approvals and selects a specific lender approval. The dealer proceeds to "deal desking" on the remote system where the dealer itemizes contract numbers including fees, insurance products, taxes, etc. The remote system can perform all necessary financial calculations including payment amounts, finance charges, etc.

Additionally, the remote system generates an XML file which contains all transaction-specific data including borrower information, collateral information, and contract itemization. The XML file is submitted to the document generation system securely via a data network such as the Internet, and a finalized merged document set is requested. In an automatic mode, the document generation system selects the document set automatically based on the transaction data, e.g., the dealer is in Texas and lender is ABC Bank. The document generation system then validates the transaction data based on the document set selected to ensure all of the required data elements are present in the request to print the selected document set. The document generation system assembles the document set, "stamps" the data on the document(s), and returns, e.g., a single merged document stream back to the remote system, whereupon the remote system renders the merged document set downstream to the dealer for display and printing at the dealer's location.

In accordance with a second use-case scenario, the dealer logs into the remote system and submits a credit application containing borrower information, collateral information, etc. Again, it should be noted that the credit application itself may be printed via the document generation system for the borrower to, e.g., sign. The credit application is reviewed and approved by one or more lenders on the remote system platform. The dealer reviews lender approval and selects a specific lender approval, whereupon the dealer proceeds to deal desking on the remote system. That is, the dealer itemizes contract numbers including fees, insurance products, taxes, etc. As with the first use-case scenario, the remote system can perform all necessary financial calculations including payment amounts, finance charges, etc., and generates an XML file which contains all of the transaction-specific data including borrower information, collateral information, and contract itemization. Also like the first use-case scenario, is submitted to the document generation system securely via a data network such as the Internet, and a finalized merged document set is requested. In an automatic mode, the document generation system selects the document set automatically based on the transaction data, e.g., the dealer is in Texas and lender is ABC Bank.

However, in this second use-case scenario, the document generation system returns the list of documents back to the remote system, and the remote system displays the list of documents to the dealer, whereupon the dealer selects one or more documents for printing. The remote system then re-transmits the XML file containing the transaction data and the list of documents the dealer has selected. The document generation system validates the data based on the document set requested to ensure all of the required data elements are present in the request to print the requested document set. The document generation system assembles the document set, stamps the data on the documents and returns a single merged document stream back to the remote system, and the remote system renders the merged document set downstream to the dealer for display and printing at the dealer's location.

Various embodiments are described from a "module" perspective, where the document generation system comprises the following modules: a proxy web service; a security web service; a document generation system web service; an extensible stylesheet transformations (XSLT) transformation engine; a document generation system database; a rules engine; a document repository; and a "test rig."

The proxy web service enables a remote system interfacing with the document generation system to connect to the document generation system, and hand off the XML data. This service authenticates a remote user whose credentials are passed in SOAP headers, and upon successful authentication, passes an XML request on to the document generation system web service for further processing. Processing responses generated by the document generation system web service are then returned to the remote system by the proxy web service.

The security web service is called by the proxy web service to authenticate the credentials passed thereto by the remote system. The security web service connects to a database that stores a list of users and permissions to verify, e.g., the username and password submitted in an authentication request.

The document generation system web service can be thought of as the core engine of document generation system. Once the document generation system web service receives XML data from the proxy web service, it performs the following procedures. If no document list was specified in the XML request (i.e., in automatic mode) the document set is determined in real-time by invoking the rules engine (described below) to evaluate rules against the transaction data to determine the proper document set. If a document list was specified in the XML request (i.e., in manual mode) the submitted list of documents is used as the document set to be generated. If the type of XML request is of a type "DocumentList," the list of documents is determined in the steps above and further execution of processes is halted. If the type of XML request is of a type "Documents," a data validation engine is invoked to validate the transaction data, where the data validation that occurs is a two-tiered process as follows: transaction data submitted in the XML request is validated to ensure that the minimum set of data fields are present to properly populate and assemble the required document set; and state specific annual percentage rage (APR) and fee maximums are validated where applicable and available. Data validation issues that are found can be of two types, i.e., "Error" and "Warning." If one or more validation issues are of the Error type, further execution is halted and a list of the error messages are returned to the user/caller. If there are no Error type validation issues, but one or more Warning type validation issues exist and the XML request does not request that warnings are to be bypassed, further execution is halted and a list of the error messages are returned to the caller. If however, the XML request does request that warnings are bypassed, further processing continues.

Each document in the required document set is retrieved from a document repository (described in greater detail below and a XSLT transformation engine is invoked to overlay and stamp the transaction data onto each document. Additionally, the transaction data is logged in a document generation system database for billing and tracking purposes. Logged transaction data can include, but is not limited to, information associated with a dealer, a lender, a customer, etc. Lastly, if the XML request indicates that all of the documents in the document set are to be merged, the document generation system web service/core engine merges all of the documents in the document set into a single stream which is returned to the caller. Otherwise, multiple streams, each containing an individual document in the document set, is returned to the caller.

XSLT refers to a World Wide Web Consortium (W3C) programming language standard, where the XSLT programming language is used to transform input XML files into a variety of output formats including, e.g., HTML, XHTML, PDF, XML, etc. The XSLT transformation engine is made up of industry standard XSLT 2.0 transform files that are utilized to stamp data onto a document by transforming the input XML data. The XSLT transformation engine applies a master transform that is configured for the input XML Object type. Subsequently, one or more additional transform files are applied that are configured for each document. Additionally, a process order can be specified to define the sequence in which transforms will be applied. Transforms that are applied have an overriding effect over the prior transform file applied. For example, if a prior transform file set the value of the social security number (SSN) field to the SSN of the primary borrower, but a subsequent transform file set the value of the SSN field to the SSNs of all borrowers, the final value of this SSN field will be the SSNs of all borrowers.

The document generation system database is a relational database that contains the following types of information which are utilized by the various modules within the document generation system: a list of XML Objects supported in the document generation system; a list of documents categorized by Object and DocumentType along with the path to the document in the document repository; a list of data validation attributes that need to be validated for a given DocumentType; a list of XSLT transform files along with path to the transform file in the document repository (the document generation system supports a global transform file for each XML Object type and additional optional transform files for each document); and transaction logging data.

The rules engine refers to a generic web service-based engine that can be invoked to evaluate rules against a specified input data set. The rules engine utilizes a database that is used to store and retrieve the rules that are to be evaluated against a given input data set. The rules engine is also able to modify the input data set based on one or more conditions being satisfied or not satisfied.

The document repository refers to a local or network-based shared storage media that stores the following types of files: documents; XSLT transform files; and readme/help files.

The test rig is a component module that is utilized to test and perform quality assurance on the document generation system. The test rig is made up of an application (web or Windows client-based) that can submit one or more input XML files to the document generation system webservice/core engine for processing. The response received by the document generation system webservice/core engine is compared to a "last known good configuration" that is stored in a database, and the differences in output are, e.g., highlighted or otherwise identified and displayed to a quality control analyst or tester. The test rig simplifies ongoing updates and maintenance of the document generation system/platform that involves changes to the documents contained in the document repository/library.

Because an end-user is able to access the document generation system from, e.g., a credit aggregator portal, none of the documents to be populated with contract data, for example, need to be locally stored at the remote system resulting in easier installation and integration of the remote system with the document generation system. Additionally, and as described above, the document generation system can provide a test environment (i.e., the test rig) that can also be accessed and implemented over the web, where in addition to the above-described functionality, a test rig user interface can be configured to present a list of test cases, categorized by, e.g., user object type, and by categories set up by the user, e.g., by state. To initially create test cases, a quality assurance analyst imports serialized object files from the document generation system's logging location and selecting the user object type and category from, e.g., a configurable droplist. The analyst may select a set of test cases and/or a set of categories, or alternatively, a series of new 'test case' records are created which are flagged as being un-validated and labeled with, e.g., test case name/time stamp/user/user object type. The test application is invoked and the analyst is presented with the changes (e.g., added or deleted forms, added/changed/deleted field values, etc.) since the latest 'validated' test case for a particular object type and category combination. Moreover, an analyst is given opportunities to discard test cases or identify those test cases which have been validated.

In accordance with various embodiments, the document generation system described herein provides a centralized delivery model for document generation and printing. Unlike conventional document printing systems/engines that are captive to a host system, various embodiments of the invention enable easy access and integration thereto from remote systems such as credit aggregator portals, DMSS, etc. Furthermore and by virtue of the centralized delivery model, automatic form updates/changes can be efficiently provided to end-users. For example, initial library mapping, partner remapping due to regulatory enactments, and/or ongoing form maintenance is unnecessary. Further still, various embodiments provide transaction tracking capabilities to address, e.g., billing needs of end-users such as auto dealers and the like. Moreover, compliance with various regulations and requirements via the validation processes described above can be presented from a service perspective as opposed to being the sole responsibility of the end-user. It should be noted that although various embodiments of the invention described herein have been in the context of auto purchasing/indirect loans applicable to be auto purchases, various embodiments can be implemented for generation and/or printing documents associated with other industries/environments including but not limited to human resources, goods and services contracts, etc.

As can be seen from the above, the present invention provides a system, method, and computer program product, embodied on a computer-readable medium, for creating documents and assembling computer-processable components. Additional features and advantages of the invention are set forth in the appended claims.

What is claimed is:

1. A method for generating documentation, comprising:
receiving at a document generation system data representative of required data from a remote system, the remote system configured to selectively operate in accordance with at least an automatic mode of document selection and a manual mode of document selection, the required data in an extensible markup language (XML) format and received at the document generation system via a data network, the data including an indication of a document generation mode comprising one of the automatic mode of document selection, where the document generation system identifies at least one document to be populated with the required data, and the manual mode of document selection, where the data received from the remote system identifies the at least one document to be populated with the required data;
invoking the one of the automatic mode and the manual mode of document selection in response to the received data indicative of the document generation mode;
selecting from a document repository and assembling the at least one document to be populated with the required data;
validating the required data in relation to a set of requirements associated with the at least one document;
merging the required data with the at least one document; and
streaming the at least one document via the data network in a presentation format to the remote system for at least one of presentation and printing.

2. The method of claim 1, wherein the remote system comprises at least one of a dealer management system, a credit aggregator partner, and a financial services dealer.

3. The method of claim 1 further comprising, the document generation system automatically selecting in real-time the at least one document for the merging of the required data therein upon invocation of the automatic mode by evaluating, via a rules engine, the received data against a plurality of rules.

4. The method of claim 1 further comprising, the document generation system manually selecting the at least one document for the merging of the required data therein in response to a XML document list received by the document generation system.

5. The method of claim 3, further comprising, automatically modifying a portion of the required data by the rules engine prior to merging the required data with the at least one document.

6. The method of claim 1 further comprising, notifying the remote system of an error upon the validation of the required data before the streaming of the at least one document.

7. The method of claim 1, wherein the data network comprises the Internet.

8. The method of claim 1, wherein the presentation format comprises a pdf format.

9. The method of claim 8, wherein the streaming of the at least one document comprises transmitting the at least one document as a single stream in the pdf format.

10. The method of claim 8, wherein the streaming of the at least one document comprises transmitting each of the at least one document as separate streams, each of the separate streams being in the pdf format.

11. The method of claim 1 further comprising, electronically signing the at least one document.

12. The method of claim 1 further comprising, digitally signing the at least one document by the document generation system.

13. The method of claim 12 further comprising, securely archiving the at least one document enabling subsequent retrieval of the at least one document.

14. A computer program product, fixed on a non-transitory computer-readable medium, comprising computer code configured to perform the processes of claim 1.

15. A system for document generation, comprising:
a remote system configured to selectively operate in accordance with at least an automatic mode of document selection and a manual mode of document selection, the remote system further configured to:
receive required data from an end-user;
receive a selection from an end-user of the automatic mode, where the document generation system identifies at least one document to be populated with the required data, or the manual mode of document selection, where the at least one document to be populated with the required data is identified by the remote system;
generate extensible markup language (XML) data representative of the required data and, in the event that the manual mode of document selection has been selected, the at least one document; and
transmit the XML data and the selection by the end-user; and
a document generation system configured to:
receive the XML data and the selection by the end-user via a data network;
select the at least one document from a document repository associated with the document generating system, selection of the at least one document being determined automatically from the required data or in response to a document list in the XML data in accordance with the selection by the end-user;
assemble the at least one document to be populated with the required data;
validate the required data;
merge the required data with the at least one document; and
stream the at least one document in a presentation format to the remote system for at least one of presentation and printing.

16. The system of claim 15, wherein the remote system comprises at least one of a dealer management system, a credit aggregator partner, and a financial services dealer.

17. The system of claim 15, wherein the document generation system includes a rules engine configured to automatically select the at least one document for the merging of the required data therein based on an evaluation of the XML data in relation to at least one condition.

18. The system of claim 15, wherein an end-user of the remote system manually selects the at least one document for the merging of the required data therein.

19. The system of claim 15, wherein the document generation system notifies the remote system of an error upon the validation of the required data before the streaming of the at least one document.

20. The system of claim 15, wherein the data network comprises the Internet.

21. The system of claim 15, wherein the presentation format comprises a pdf format.

22. The system of claim 21, wherein the document generation system streams the at least one document by transmitting the at least one document as a single stream in the pdf format.

23. The system of claim 21, wherein the document generation system streams the at least one document by transmitting each of the at least one document as separate streams, each of the separate streams being in the pdf format.

24. The system of claim 21 further comprising, an electronic signature apparatus configured to permit electronic signing of the at least one document.

25. The system of claim 21, wherein the document generation system is further configured to digitally sign the at least one document.

26. The system of claim 25, wherein the document generation system is further configured to securely archive the at least one document enabling subsequent retrieval of the at least one document.

* * * * *